US011838888B2

(12) United States Patent
Obaidi et al.

(10) Patent No.: US 11,838,888 B2
(45) Date of Patent: Dec. 5, 2023

(54) MONITORING OF RADIO FREQUENCY SIGNAL LEVELS WITHIN A WIRELESS COMMUNICATION NETWORK

(71) Applicant: T-Mobile USA, Inc., Bellevue, WA (US)

(72) Inventors: Ahmad Arash Obaidi, Issaquah, WA (US); Eric W. Yocam, Sammamish, WA (US); Paul Farag, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/994,064

(22) Filed: Aug. 14, 2020

(65) Prior Publication Data

US 2022/0053451 A1    Feb. 17, 2022

(51) Int. Cl.
*H04W 64/00*  (2009.01)
*H04W 48/16*  (2009.01)
*H04W 4/029*  (2018.01)
*H04W 48/18*  (2009.01)

(52) U.S. Cl.
CPC ......... *H04W 64/003* (2013.01); *H04W 4/029* (2018.02); *H04W 48/16* (2013.01); *H04W 48/18* (2013.01)

(58) Field of Classification Search
CPC ... H04W 64/003; H04W 4/029; H04W 48/16; H04W 48/18
See application file for complete search history.

(56) References Cited

U.S. PATENT DOCUMENTS

| 6,252,400 B1* | 6/2001 | Loncar .............. G01R 33/5615 324/309 |
| 10,263,657 B2* | 4/2019 | Niemi .................. H04B 1/3838 |
| 10,536,867 B2* | 1/2020 | Salajegheh .......... H04B 7/0626 |
| 11,031,967 B2* | 6/2021 | Mueck ................ H04W 52/367 |
| 2008/0139125 A1* | 6/2008 | Son ..................... H04B 17/318 455/67.11 |
| 2008/0146161 A1* | 6/2008 | Bugenhagen ........ H04B 17/318 455/67.11 |
| 2012/0163202 A1* | 6/2012 | Aguirre ................... H04L 41/12 370/252 |
| 2012/0242548 A1* | 9/2012 | Badaruzzaman ...... H01Q 13/16 343/702 |
| 2012/0264382 A1* | 10/2012 | Lockerbie ............. H04B 17/12 455/90.2 |
| 2013/0194746 A1* | 8/2013 | Lockerbie .............. G06F 1/206 361/679.48 |

(Continued)

*Primary Examiner* — Steven S Kelley
(74) *Attorney, Agent, or Firm* — Lee & Hayes, P.C.

(57) ABSTRACT

Systems and methods discussed herein are directed to monitoring and/or adjusting levels of ambient radio frequency (RF) signals within a wireless communication network. A geographic region is monitored for ambient radio frequency signal levels. The monitoring may be performed by a device configured for operation in the wireless communication network. For example, one or more of a UE, a base station, an IoT device, etc., may be configured with a sensor for sensing ambient RF signal levels. When it is determined that a measured amount of ambient radio frequency signal level exceeds a predetermined threshold, an operator of the wireless communication network may then provide an alert to at least one user of the wireless communication network.

17 Claims, 4 Drawing Sheets

(56) References Cited

U.S. PATENT DOCUMENTS

| | | | |
|---|---|---|---|
| 2014/0175876 A1* | 6/2014 | Cheatham, III | H02J 50/80 |
| | | | 307/23 |
| 2014/0235287 A1* | 8/2014 | Maltsev | H04B 7/0452 |
| | | | 455/522 |
| 2015/0031307 A1* | 1/2015 | Gao | H04L 43/16 |
| | | | 455/67.11 |
| 2017/0192478 A1* | 7/2017 | Mercer | H01Q 3/24 |
| 2017/0267170 A1* | 9/2017 | Be | B60Q 9/00 |
| 2019/0165824 A1* | 5/2019 | Mohamed | H04M 1/72454 |
| 2019/0174255 A1* | 6/2019 | Anders | H04L 67/18 |
| 2019/0342811 A1* | 11/2019 | Stauffer | H04W 36/22 |

\* cited by examiner

MONITORING OF RADIO FREQUENCY SIGNAL LEVELS WITHIN A WIRELESS COMMUNICATION NETWORK

BACKGROUND

Electronic devices are increasingly able to communicate with other entities, e.g., other electronic devices. Many of these devices are referred to as "connected devices," such as, for example, devices configured as Internet of things (IoT) devices, machine-to-machine (M2M) devices, etc. Such devices, as well as mobile electronic devices, such as, for example, smart phones, portable computers, notebooks, laptops, etc., and other types of computing devices, both mobile and stationary, often communicate with other entities, e.g., servers, other similar devices, etc., over the Internet via wireless communication networks.

Wireless communication networks continue to evolve to provide better quality of service and user experience as the number of electronic devices operating within wireless communication networks increases. Thus, there are various operating protocols and operating standards that have been developed, and continue to be developed, for wireless communication networks. For example, there are standards related to third generation (3G), Long Term Evolution (LTE), fourth generation (4G), and fifth generation (5G) operating protocols. Many of the operating protocols have been developed and/or adopted by the Third Generation Partnership Project (3GPP).

As the popularity of mobile electronic devices, e.g., smart phones, computing devices, etc., as well as IoT devices, increases, numerous cellular towers and femtocells will be needed. The femtocells are particularly used in the 5G protocol of wireless communications. These cellular towers and femtocells are needed in order to provide service to mobile electronic devices and IoT devices as part of the digital world augmentation of the real world.

Exposure to ambient radio frequencies (RF) used in operation of wireless communication networks can potentially interact with the human body by increasing body temperature. This is especially concerning for sensitive individuals and pets including, for example, newborns, young children, elderly people, patients, wildlife, and people with weak immune systems. As is known, there are cases of close or extreme exposure to ambient RF signals by mobile technicians that have resulted in what is termed "RF burn." Currently, mobile electronic devices and IoT devices are safe to use even in congested urban areas. However, as the increased demand in usage for more connectivity occurs, especially in urban areas, the risk of overexposure to ambient RF signals will increase. For example, as 5G protocols are implemented, more antennas, e.g., femtocells, are required. RF signals from such femtocells are generally millimeter (mm) waves and thus generally cannot easily pass through buildings. Accordingly, for 5G there are more femtocells having antennas that are closer to people than other protocols that primarily use base stations and other access points.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
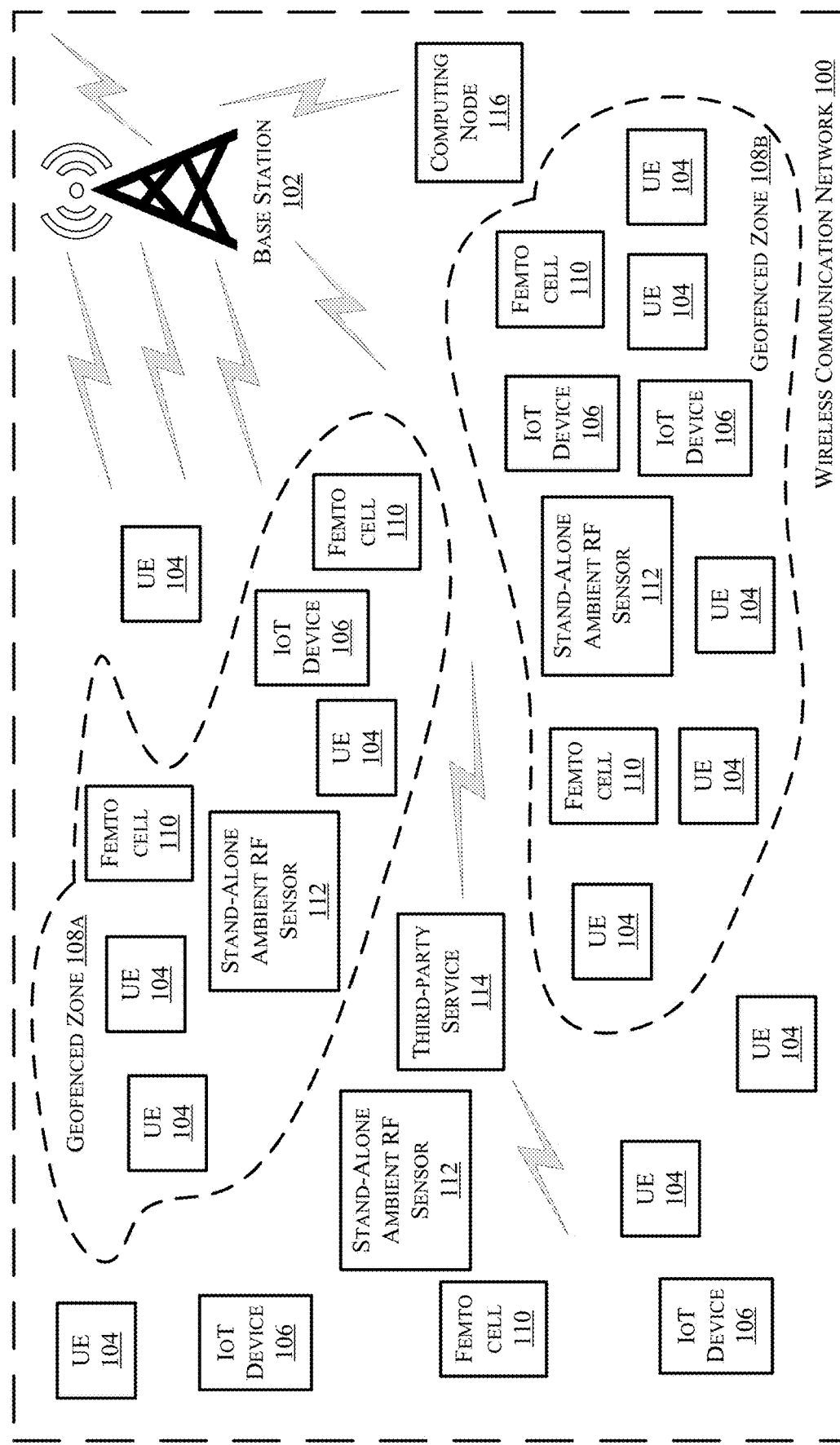
FIG. 1 schematically illustrates an example portion of a wireless communication network, in accordance with various configurations.

Techniques and architecture are described herein for monitoring and/or adjusting levels of ambient radio frequency (RF) signals within a wireless communication network. In particular, sensors may be included within the wireless communication network for measuring or monitoring levels of ambient RF signals. For example, base stations, femtocells, mobile electronic devices, IoT devices, etc., may be equipped with sensors for measuring and/or monitoring ambient RF signals. Additionally, standalone sensors may be positioned at various locations within the wireless communication network. The standalone sensors may provide information with respect to RF signal levels in the areas that include the standalone sensors. The ambient RF signal level may represent ambient RF energy density.

In configurations, areas or zones may be geofenced and monitored for levels of ambient RF signals. For example, school zones, parks, shopping areas, etc., may be geofenced as ambient RF signal zones of interest. Likewise, nursing homes, hospitals, especially surgery areas, etc., may be geofenced and monitored for ambient RF signal levels. Such ambient RF signal zones may be monitored using sensors on one or more of mobile electronic devices, IoT devices, femtocells, nearby base stations, and/or other access points, etc. When ambient RF signal levels reach a particular level or threshold, alerts may be provided to mobile electronic devices, IoT devices, etc., of users within the affected geofenced zone. In configurations, an operator of the wireless communication network may adjust RF signal transmission within the affected geofenced zone to lower the ambient RF signal level within the affected zone.

Geofenced zones may be deemed "RF signal free" zones in configurations. For example, a surgery room within a hospital may be deemed to be an ambient RF signal free zone. Thus, except for emergency signals, e.g., emergency communications, no RF signals may be permitted by the operator of the wireless communication network within the surgery room. Such ambient RF signal free zones may be adjustable. For example, the surgery room may only be deemed to be an ambient RF signal free zone when a surgery is being performed. Likewise, entertainment venues such as, for example, theaters, restaurants, stadiums, etc., may be adjustable ambient RF signal free zones. RF signal transmission within, for example, a theater, may be prohibited, except for emergency signals, e.g., emergency communications, during exhibition of a movie, performance of a play, a concert, etc. In order for users to "opt in" for such ambient RF signal free situations, a ticket, for example, when purchased, may provide the operator of the venue with a license to discontinue RF signal transmission within the venue during the performance of the play, a concert, exhibition of the movie, etc. Such discontinuation of RF signal transmission may include discontinuation of even emergency RF signal transmission, e.g., emergency communications.

A situation for only emergency calls may be allowed in various geofenced zones, e.g., venues to mitigate ambient RF signal levels. Additionally, there may be a list of emergency contacts for which calls to a user's mobile electronic device may be permitted. Likewise, calls, emergency and/or non-emergency, may be rerouted to another device of the user to help mitigate ambient RF signal levels within geofenced zones.

As previously noted, in configurations, an operator of the wireless communication network may monitor various geofenced zones for ambient RF signal levels and when a predetermined level or threshold is reached, the operator may automatically alter the RF signal transmission within the geofenced zone. This may be with or without notice provided to users of the wireless communication network within the affected geofenced zone. Likewise, the operator of the wireless communication network may provide notice to users as they approach a geofenced zone that is currently experiencing high ambient RF signal levels. In configurations, the operator of the wireless communication network may provide an alternative route to the user for avoiding the affected geofenced zone. Additionally, the operator of the wireless communication network may provide an alternative to the user with respect to the affected geofenced zone. For example, if the affected geofenced zone is a park, then the operator of the wireless communication network may provide one or more other parks that have lower or safer ambient RF signal levels therein that the user may wish to visit. The notifications to users from the wireless communication network may be visual and/or audible. For example, a text message may be provided to a device of the user. Additionally, or alternatively, an audio signal such as, spoken words, an alarm type signal, etc., may be provided to the device of the user.

In configurations, the operator of the wireless communication network may perform the monitoring of the ambient RF signal levels within geofenced zones and may notify a third-party service of the ambient RF signal levels within the geofenced zone. The third-party service may then provide the alerts to the users. In configurations, alerts may be provided that simply provide a current measurement of wireless signals within the geofenced zone, e.g., that the ambient RF signal levels in the geofenced zone are below a predetermined level or threshold.

In configurations, users within the wireless communication network may set personal threshold limits. For example, various entities may list a range of ambient RF signal levels that is safe within geofenced zones. However, the operator of the wireless communication network may determine a predetermined threshold within the range that is narrower or smaller than the overall range. Likewise, users may set their own range of ambient RF signal levels that the user believes to be safe. For example, a user's pacemaker may be affected by ambient RF signals. Thus, a user with a pacemaker may have a lower threshold for ambient RF signals which that particular user believes to be safe.

The alerts provided by the operator of the wireless communication network and/or the third-party service may also provide mitigation steps to the user that may reduce the user's exposure to the ambient RF signals. For example, the user may have some type of protective clothing, e.g., clothing configured as a faraday shield, that the user may wear to protect at least a portion of their body. Likewise, a baby stroller may include a component, e.g., a faraday shield, that may be utilized to help protect a baby within the baby stroller from ambient RF signals.

FIG. 1 schematically illustrates a portion of a wireless communication network 100. The wireless communication network 100 includes one or more base stations 102 that are configured to operate according to one or more operating protocols. User equipments (UEs) 104 are configured to operate within the wireless communication network 100 according to one or more operating protocols. In configurations, the one or more of the base stations 102 and one or more of the UEs 104 are configured to operate according to at least 5G operating protocols. One or more base stations 102 and one or more of the UEs 104 may be additionally, or alternatively, configured to operate according to other operating protocols including, but not limited to, Global System for Mobile Communications (GSM), Time Division Multiple Access (TDMA), Universal Mobile Telecommunications System (UMTS), Evolution-Data Optimized (EVDO), 3G, 4G, Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like. FIG. 1 also illustrates Internet of things (IoT) devices 106 (also known as a machine-to-machine (M2M) device) configured to operate within the wireless communication network 100. Generally, there are many wireless communication devices, e.g., UEs 104, and IoT devices 106, operating within the wireless communication network 100.

The UEs 104 may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. Although this description predominantly describes the UEs 104 as being "mobile" (i.e., configured to be carried and moved around), it is to be appreciated that the UEs 104 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UEs 104 may be capable of communicating over wired networks, and/or wirelessly using any suitable wireless communications/data technology, protocol, or standard, such as those mentioned above.

In configurations, geofenced zones 108 of the wireless communication network 100 may be monitored for levels of ambient RF signals. The example portion of wireless communication network 100 includes only two geofenced zones 108a and 108b, but it is to be understood that the wireless communication network may include many more geofenced zones 108. In configurations, the geofenced zones 108 may be, for example, school zones, parks, shopping areas, schools, hospitals (especially surgery areas), nursing homes, office buildings, etc. The geofenced zones 108 may be geofenced as ambient RF signal zones of interest that may be monitored for ambient RF signal levels. The ambient RF signal level may represent ambient RF energy density present in the geofenced zones 108. The geofenced zones 108 may be monitored using sensors on one or more of the UEs 104, the IoT devices 106, femtocells 110, one or more of the one or more base stations 102 in close proximity to the ambient RF signal zones 108, and/or other access points (not illustrated), etc. Standalone ambient RF sensors 112 may also be used to monitor ambient RF signal levels within the geofenced zones 108. A computing node 116 within the wireless communication network 100 includes a communication interface, one or more processors, hardware, memory, dense an ambient saturated engine with a dense RF geo-fence collector module, a dense RF geo-fence policy module, a dense RF geo-fence alerts/notification module, a dense RF geo-fence location module, a dense RF event correlation module, a data store, a dense RF geo-fence data store, a dense RF geo-fence policies, and a dense RF geo-fence record database. Thus, the computing node 116 may receive via, one or more of the femtocells 110, base station(s) 102, other access points (not illustrated), etc., data from one or more of standalone ambient RF sensors 112, base station(s) 102, UEs 104, IoT devices 106, femtocells 110, other access points (not illustrated), etc. The computing node 116 may be implemented via one or more servers 400 described herein with respect to FIG. 4.

When ambient RF signal levels reach a particular level or threshold, alerts may be provided to UEs 104, IoT devices 106, etc., of users within the affected geofenced zone 108. In configurations, such alerts may be generated and transmitted by the computing node 116. In configurations, an operator of the wireless communication network 100 may adjust RF signal transmission within the affected geofenced zone 108 to lower the ambient RF signal level within the affected geofenced zone 108.

Geofenced zones 108 may be deemed "RF signal free" zones in configurations. For example, if geofenced zone 108a is a surgery room within a hospital, the geofenced zone 108a may be deemed to be an ambient RF signal free zone. Thus, except for emergency signals, e.g., emergency communications, no RF signals may be permitted by the operator of the wireless communication network 100 within the geofenced zone 108a. Such ambient RF signal free zones may be adjustable. For example, the geofenced zone 108a, e.g., surgery room, may only be deemed to be an ambient RF signal free zone when a surgery is being performed. Additionally, there may be a list of emergency contacts for which communications, such as, for example, calls or text messages, to a user's UE 104 may be permitted. Likewise, communications, such as, for example, calls or text messages, emergency and/or non-emergency, may be rerouted to another UE 104 of the user.

In configurations, entertainment venues such as, for example, theaters, restaurants, stadiums, etc., may be adjustable ambient RF signal free zones. RF signal transmission within, for example, a theater, may be prohibited, except for emergency signals, e.g., emergency communications, during exhibition of a movie, performance of a play, a concert, etc. In order for users to "opt in" for such ambient RF signal free situations, a ticket, for example, when purchased, may provide the operator of the venue with a license to discontinue RF signal transmission within the venue during the performance of the play, a concert, exhibition of the movie, etc. Such discontinuation of RF signal transmission may include discontinuation of even emergency RF signal transmission, e.g., emergency communications. Additionally, there may be a list of emergency contacts for which communications, such as, for example, calls or text messages, to a user's UE 104 may be permitted. Likewise, communications, such as, for example, calls or text messages, emergency and/or non-emergency, may be rerouted to another UE 104 of the user.

A situation for only emergency calls may be allowed in various geofenced zones to mitigate ambient RF signal levels. For example, if geofenced zone 108b is a park that reaches a high level of ambient RF signals, then the operator of the wireless communication network 100 may limit operation of UEs 104 and/or IoT devices 106 to only emergency communications. Additionally, there may be a list of emergency contacts for which communications, such as, for example, calls or text messages, to a user's UE 104 may be permitted. Likewise, communications, such as, for example, calls or text messages, emergency and/or non-emergency, may be rerouted to another UE 104 of the user to help mitigate ambient RF signal levels within the geofenced zone 108b.

As previously noted, in configurations, an operator of the wireless communication network 100 may monitor various geofenced zones 108 for ambient RF signal levels and when a predetermined level or threshold is reached, the operator may automatically alter the RF signal transmission within the affected geofenced zone 108. This may be with or without notice provided to users of the wireless communication network 100 within the affected geofenced zone 108. Likewise, the operator of the wireless communication network 100 may provide an alert or notice to UE(s) 104 and/or IoT devices 106 of users as the users approach a geofenced zone 108 that is currently experiencing high ambient RF signal levels or in response to a request from a user. In configurations, the operator of the wireless communication network 100 may provide an alternative route to the user for avoiding the affected geofenced zone 108. Also, the operator of the wireless communication network 100 may provide an alert or notice to users that a geofenced zone 108 within which the users are located has reached a high level and/or unsafe level of ambient RF signals. Additionally, the operator of the wireless communication network 100 may provide an alert or notice to users that a geofenced zone 108 that the users are approaching or within which the users are located has dropped below a high level and/or unsafe level of ambient RF signals. The operator of the wireless communication network 100 may provide an alert or notice to UE(s) 104 and/or IoT devices 106 of users in response to receiving a request from a user.

Additionally, the operator of the wireless communication network 100 may provide an alternative to the user with respect to the affected geofenced zone 108. For example, if the affected geofenced zone, e.g., geofenced zone 108a, is a park, then the operator of the wireless communication network 100 may provide one or more other parks, e.g., geofenced zone 108b, that have lower or safer ambient RF signal levels therein that the user may wish to visit. The notifications to users from the wireless communication network 100 may be visual and/or audible. For example, a text message may be provided to a UE 104 of the user. Additionally, or alternatively, an audio signal such as, spoken words, an alarm type signal, etc., may be provided to the UE 104 of the user.

In configurations, alerts may be provided that simply provide a current measurement of wireless signals within the geofenced zone 108, e.g., that the ambient RF signal levels in the geofenced zone 108 are below a predetermined level or threshold. Additionally, or alternatively, the alerts may include a length of time that a user has been exposed to ambient RF signals.

In configurations, the operator of the wireless communication network 100 may perform the monitoring of the ambient RF signal levels within geofenced zones 108 and may notify a third-party service 114 of the ambient RF signal levels within the geofenced zone 108. The third-party service 114 may then provide the alerts to the UEs 104 and IoT device 106 via the wireless communication network 100.

The alerts provided by the operator of the wireless communication network 100 and/or the third-party service 114 may also provide mitigation steps to the user that may reduce the user's exposure to the ambient RF signals. For example, the user may have some type of protective clothing, e.g., clothing configured as a faraday shield, that the user may wear to protect at least a portion of their body. Likewise, a baby stroller may include a component, e.g., a faraday shield, that may be utilized to help protect a baby within the baby stroller from ambient RF signals.

In configurations, users within the wireless communication network 100 may set personal threshold limits. For example, various entities may list ranges of ambient RF signal levels that are safe for various users and/or conditions. However, the operator of the wireless communication network 100 may determine a predetermined threshold within a range that is narrower or smaller than an overall approved range. Likewise, users may set their own range of ambient RF signal levels that the user believes to be safe. For example, a user's pacemaker may be affected by ambient RF signals. Thus, a user with a pacemaker may have a lower threshold for ambient RF signals which that particular user believes to be safe. The predetermined thresholds may take into account a length of time of exposure to ambient RF signals. An example of a predetermined threshold is in a range of 80 μW/cm2 to 100 μW/cm2.

As can be seen, FIG. 1 includes UEs 104 and IoT devices 106 outside geofenced zones 108a, 108b. Users of these UEs 104 and IoT devices 106 may eventually move into the geofenced zones 108a, 108b or may avoid one or more of the geofenced zones 108a, 108b based on ambient RF signal levels. The UEs 104 and IoT devices 106, along with standalone ambient RF sensors 112, may monitor ambient RF signal levels even though the UEs 104 and IoT devices 106 are not in a geofenced zone 108. One or more of the users may request that a geographic region of the wireless communication network 100 be defined as geofenced zone 108. Alerts may be provided to the UEs 104 and IoT devices 106 outside the geofenced zones 108a, 108b. The alerts may inform the UEs 104 and IoT devices 106 with respect to ambient RF signal levels outside the geofenced zones 108a, 108b, and/or within the geofenced zones 108a, 108b. The alerts may advise the UEs 104 and IoT devices 106 to avoid the geofenced zones 108a, 108b or to choose one of the geofenced zones 108a, 108b over the other.

In order to implement one or more features described herein, the UEs 104 and/or IoT devices 106 may include an app to include one or more functions described herein. The app may allow for operating ambient RF signal sensors, setting ambient RF signal thresholds, receiving alerts, etc.

Figure 2:
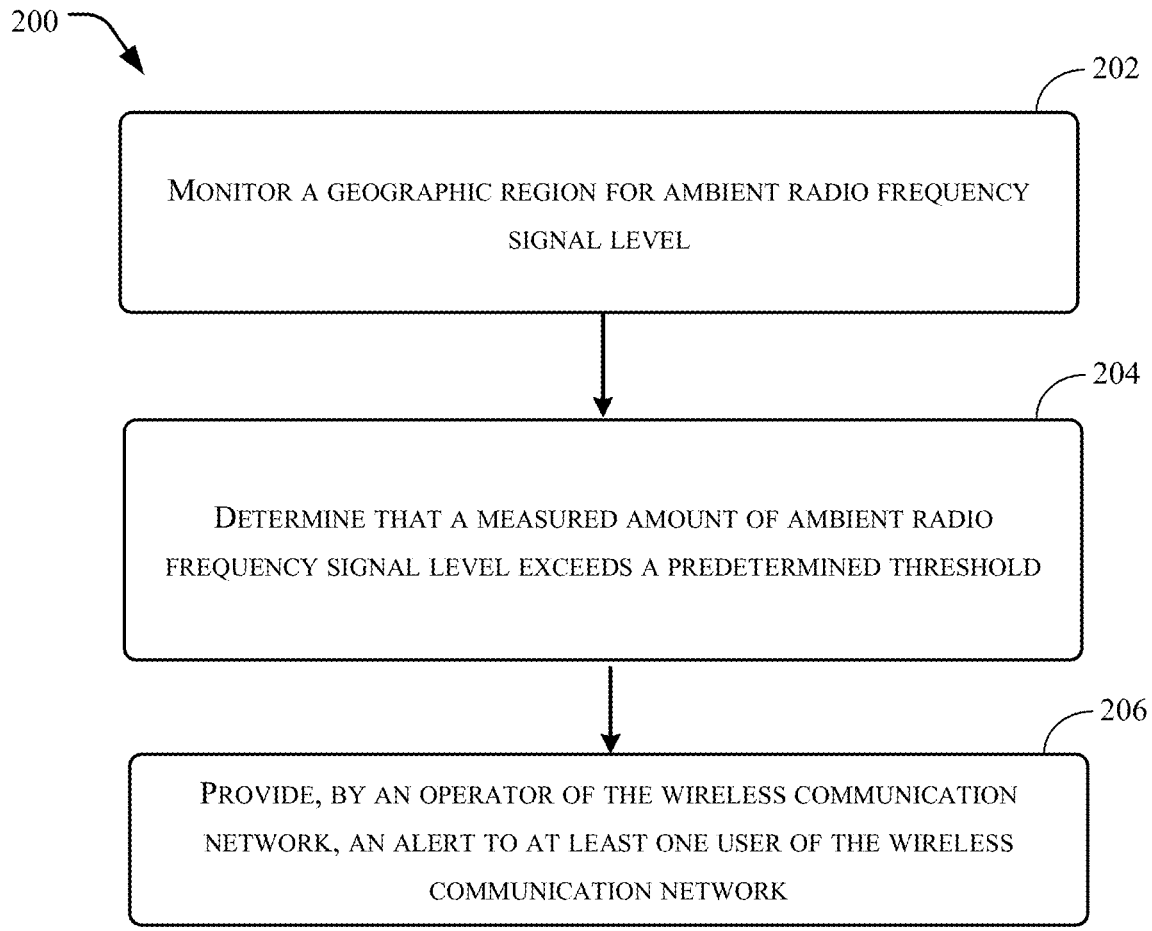
FIG. 2 is a flow diagram of an example process for monitoring levels of ambient radio frequency (RF) signals in the wireless communication network of FIG. 1, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices FIG. 2 is a flow diagram of an example process 200 for monitoring levels of ambient radio frequency (RF) signals within a wireless communication network, e.g., wireless communication network 100. At block 202, a geographic region for ambient radio frequency signal level is monitored. The monitoring may be performed by a device configured for operation in a wireless communication network. For example, one or more of a UE 104, a base station 102, an IoT device 106, etc., may be configured with a sensor for sensing ambient RF signal levels. At block 204, a measured amount of ambient radio frequency signal level is determined to exceed a predetermined threshold. At block 206, an operator of the wireless communication network provides an alert to at least one user of the wireless communication network.

Figure 3:
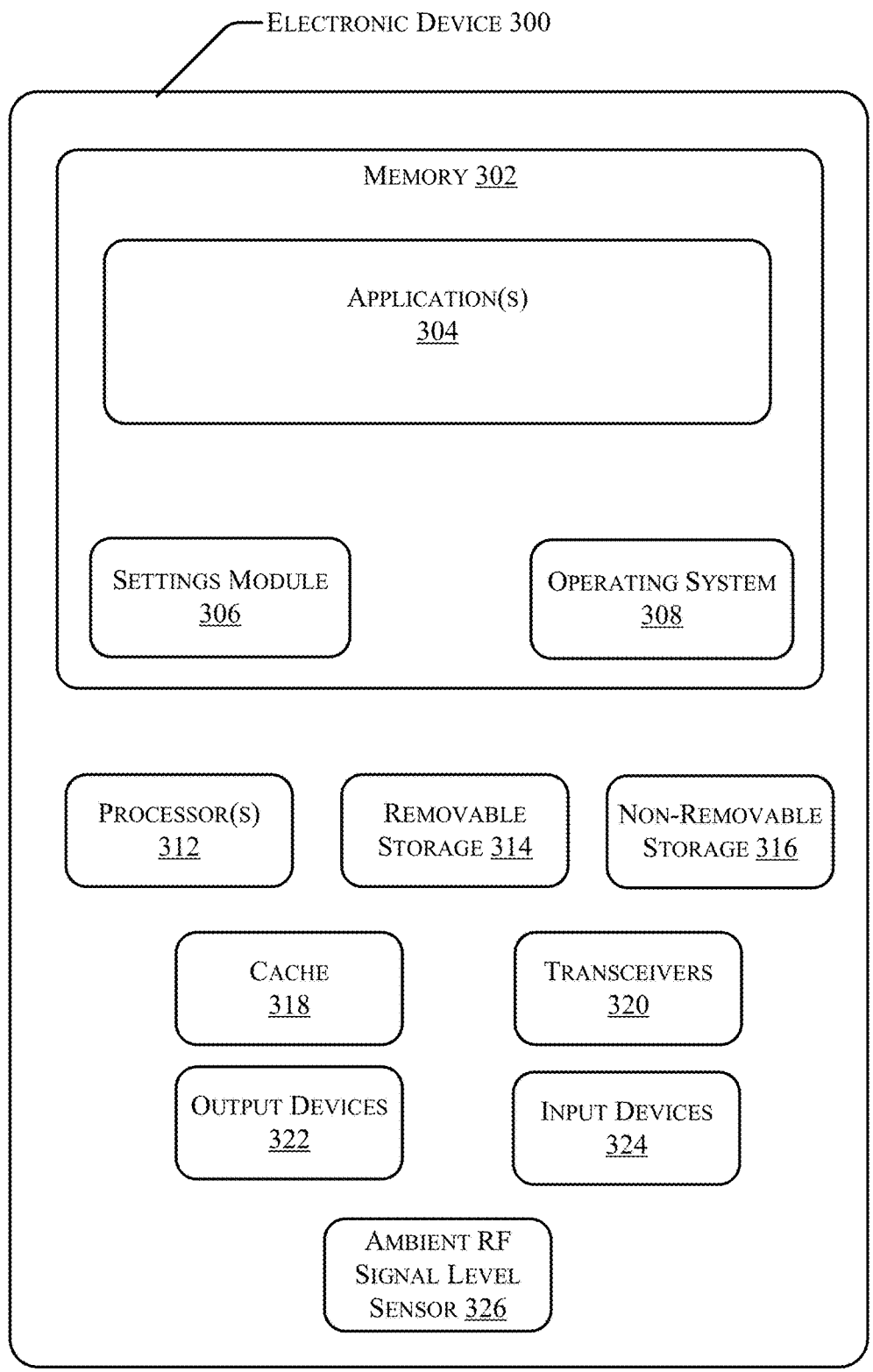
FIG. 3 schematically illustrates a component level view of an example electronic device configured for use in the wireless communication network of FIG. 1, in accordance with various configurations.

FIG. 3 schematically illustrates a component level view of an example electronic device 300, such as UE 104, configured to function within wireless communication network 100. The electronic device 300 may include more or less components depending on the type of electronic device. As illustrated, the electronic device 300 comprises a system memory 302, e.g., computer-readable media, storing application(s) 304. For example, the system memory 302 may include an application (app) configured to implement one or more functions with respect to RF signal level monitoring as described herein. The mobile device also comprises a settings module 306, and an operating system 308. Also, the electronic device 300 includes processor(s) 312, a removable storage 314, a non-removable storage 316, cache 318, transceivers 320, output device(s) 322, and input device(s) 324. The electronic device 300 may also include an ambient RF signal level sensor 326. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1 and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
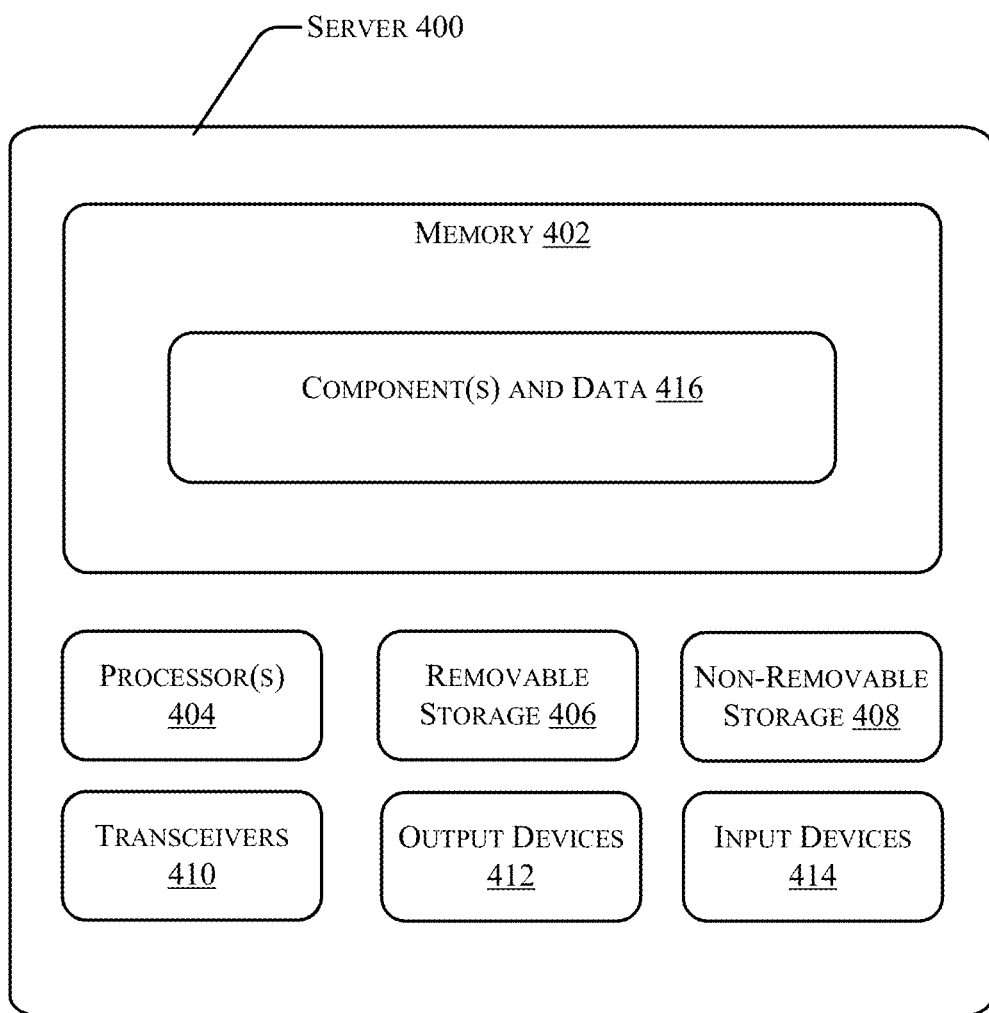
FIG. 4 schematically illustrates a component level view of a server configured for use in the wireless communication network of FIG. 1, in accordance with various configurations.

FIG. 4 illustrates a component level view of a server 400 configured for use within a wireless communication network, e.g., wireless communication network 100, in order to provide various services within the wireless communication network, according to the techniques described herein. For example, one or more servers 400 may be configured to operate as the computing node 116. Also, for example, one or more servers 400 may be configured to operate as the base station 102. As illustrated, the server 400 comprises a system memory 402 that may store one or more components, modules, and/or applications and data 416 for interacting with electronic devices 300, e.g., UEs 104 and/or IoT devices 106, or other electronic devices that may be configured as connected devices, as described herein. For example, the system memory 402 may include one or more components and/or applications configured to implement RF signal monitoring as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead of, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1 and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   monitoring, using a device configured for operation in a wireless communication network, a current geographic region for ambient radio frequency signal levels, the device including at least one of an Internet of Things (IoT) device or a base station;
   determining that a measured amount of ambient radio frequency signals received from a fifth generation (5G) base station exceeds a predetermined threshold, the predetermined threshold being associated with an unsafe level of ambient radio frequency signals associated with radio frequency burn;
   based at least in part on determining that the measured amount of ambient radio frequency signals exceeds the predetermined threshold, providing, by an operator of the wireless communication network, an alert to at least one user of the wireless communication network;

determining the type of the current geographic region and another geographic region of a same type; and providing, to the at least one user and by the operator of the wireless communication network, an alternative route to the other geographic region of the same type which avoids the current geographic region.

2. The method of claim 1, wherein the IoT device comprises at least one of a tablet computer, a laptop computer, a portable digital assistant (PDA), a wearable computer, a networked digital camera, or a motor vehicle.

3. The method of claim 1, wherein providing, by the operator of the wireless communication network, the alert to the at least one user of the wireless communication network comprises providing, by the operator of the wireless communication network, the alert to the at least one user of the wireless communication network based at least in part on receiving an inquiry from the at least one user, the inquiry being with respect to ambient radio frequency radio frequency signal levels in the current geographic region.

4. The method of claim 1, wherein providing, by the operator of the wireless communication network, the alert to at least one user of the wireless communication network comprises automatically providing, by the operator of the wireless communication network, the alert to the at least one user based at least in part on the at least one user approaching the current geographic region.

5. The method of claim 1, further comprising:
receiving a request from the at least one user defining the current geographic region as a geofenced zone for monitoring for ambient radio frequency energy density.

6. The method of claim 1, wherein the predetermined threshold is in a range of 80 μW/cm2 to 100 μW/cm2.

7. The method of claim 1, further comprising altering the amount of ambient radio frequency signals within the current geographic region in response to the measured amount of ambient radio frequency signals exceeding the predetermined threshold.

8. A non-transitory storage medium comprising instructions stored thereon, the instructions being executable by one or more processors to perform actions comprising:
monitoring, using a device configured for operation in a wireless communication network, a current geographic region for ambient radio frequency signal levels, the device including at least one of an Internet of Things (IoT) device or a base station;
determining that a measured amount of ambient radio frequency signals received from a fifth generation (5G) base station exceeds a predetermined threshold, the predetermined threshold being associated with an unsafe level of ambient radio frequency signals associated with radio frequency burn;
based at least in part on determining that the measured amount of ambient radio frequency signals exceeds the predetermined threshold, providing, by an operator of the wireless communication network, an alert to at least one user of the wireless communication network;
determining the type of the current geographic region and another geographic region of a same type; and
providing, to the at least one user and by the operator of the wireless communication network, an alternative route to the other geographic region of the same type which avoids the current geographic region.

9. The non-transitory storage medium of claim 8, wherein the IoT device comprises at least one of a tablet computer, a laptop computer, a portable digital assistant (PDA), a wearable computer, a networked digital camera, or a motor vehicle.

10. The non-transitory storage medium of claim 8, wherein providing, by the operator of the wireless communication network, the alert to the at least one user of the wireless communication network comprises providing, by the operator of the wireless communication network, the alert to the at least one user of the wireless communication network based at least in part on receiving an inquiry from the at least one user, the inquiry being with respect to ambient radio frequency energy density in the current geographic region.

11. The non-transitory storage medium of claim 8, wherein providing, by the operator of the wireless communication network, the alert to at least one user of the wireless communication network comprises automatically providing, by the operator of the wireless communication network, the alert to the at least one user based at least in part on the at least one user approaching the current geographic region.

12. The non-transitory storage medium of claim 8, wherein the actions further comprise:
receiving a request from the at least one user defining the current geographic region as a geofenced zone for monitoring for ambient radio frequency signal levels.

13. The non-transitory storage medium of claim 8, wherein the predetermined threshold is in a range of 80 μW/cm2 to 100 μW/cm2.

14. An apparatus comprising:
one or more processors; and
a non-transitory storage medium comprising instructions stored thereon, the instructions being executable by the one or more processors to cause the processors to perform one or more actions comprising:
receiving a request from at least one user defining a current geographic region as a geofenced zone for monitoring for ambient radio frequency signal levels;
monitoring, using a device configured for operation in a wireless communication network, the current geographic region for ambient radio frequency signal levels in response to receiving the request;
determining that a measured amount of ambient radio frequency signals received from a fifth generation (5G) base station exceeds a predetermined threshold, the predetermined threshold being associated with an unsafe level of ambient radio frequency signals associated with radio frequency burn;
based at least in part on determining that the measured amount of ambient radio frequency signals exceeds the predetermined threshold, providing, by an operator of the wireless communication network, an alert to at least one user of the wireless communication network;
determining the type of the current geographic region and another geographic region of a same type; and
providing, to the at least one user and by the operator of the wireless communication network, an alternative route to the other geographic region of the same type which avoids the current geographic region.

15. The apparatus of claim 14, wherein monitoring, using the device configured for operation in the wireless communication network, the current geographic region for ambient radio frequency signal levels comprises monitoring, using one or more of a mobile device, an Internet of Things (IoT) device, or a base station, the current geographic region for ambient radio frequency signal levels.

16. The apparatus of claim 14, wherein providing, by the operator of the wireless communication network, the alert to the at least one user of the wireless communication network comprises providing, by the operator of the wireless communication network, the alert to the at least one user of the wireless communication network based at least in part on receiving an inquiry from the at least one user, the inquiry being with respect to ambient radio frequency energy density in the current geographic region.

17. The apparatus of claim 14, wherein providing, by the operator of the wireless communication network, the alert to at least one user of the wireless communication network comprises automatically providing, by the operator of the wireless communication network, the alert to the at least one user based at least in part on the at least one user approaching the current geographic region.

* * * * *